(12) United States Patent
Hubauer et al.

(10) Patent No.: US 11,347,212 B2
(45) Date of Patent: May 31, 2022

(54) SMART EMBEDDED CONTROL SYSTEM FOR A FIELD DEVICE OF AN AUTOMATION SYSTEM

(71) Applicant: SIEMENS AKTIENGESELLSCHAFT, Munich (DE)

(72) Inventors: Thomas Hubauer, Garching bei München (DE); Steffen Lamparter, Feldkirchen (DE); Mikhail Roshchin, Munich (DE); Justinian Rosca, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 832 days.

(21) Appl. No.: 16/081,124

(22) PCT Filed: Apr. 7, 2016

(86) PCT No.: PCT/EP2016/057596
§ 371 (c)(1),
(2) Date: Aug. 30, 2018

(87) PCT Pub. No.: WO2017/153005
PCT Pub. Date: Sep. 14, 2017

(65) Prior Publication Data
US 2019/0079506 A1    Mar. 14, 2019

Related U.S. Application Data

(60) Provisional application No. 62/305,621, filed on Mar. 9, 2016.

(51) Int. Cl.
*G06F 11/30* (2006.01)
*G05B 23/02* (2006.01)
*G06F 11/07* (2006.01)

(52) U.S. Cl.
CPC ....... *G05B 23/0208* (2013.01); *G05B 23/024* (2013.01); *G05B 23/0229* (2013.01);
(Continued)

(58) Field of Classification Search
CPC ............... G06F 11/079; G06F 11/0793; G05B 23/0208; G05B 23/0229; G05B 23/024; G05B 23/0281
See application file for complete search history.

(56) References Cited

U.S. PATENT DOCUMENTS 9,946,244 B2   4/2018   Lo et al.
2003/0028823 A1   2/2003   Kallela
(Continued)

FOREIGN PATENT DOCUMENTS

AU   200111034 A1   5/2001
CN   1433535 A   7/2003
(Continued)

OTHER PUBLICATIONS

Chinese Office Action for Chinese Application No. 201680083312.0 dated Jul. 3, 2020, with English translation.
(Continued)

*Primary Examiner* — Matthew M Kim
*Assistant Examiner* — Kyle Emanuele
(74) *Attorney, Agent, or Firm* — Lempia Summerfield Katz LLC

(57) ABSTRACT

An embedded control system for a field device of an automation system includes: a diagnostic application interface to a backend server for signal analytics information, complex event pattern information, and diagnostic information; a physical process interface to a signal source for transferring signal data; a signal evaluation component for comparing received signal analytics information with received signal data to identify a first and a second event; an
(Continued)

event processing component for applying received event pattern information to the first and second identified events to identify a first classified event; and a diagnostic reasoning component for deriving causal dependencies between the first classified event and a further classified event with regard to diagnostic information to identify a root cause for the first classified event or predict an impact of the first classified event.

19 Claims, 2 Drawing Sheets

(52) U.S. Cl.
CPC ........ G05B 23/0281 (2013.01); G06F 11/079 (2013.01); G06F 11/0793 (2013.01)

(56) References Cited

U.S. PATENT DOCUMENTS

| | | | |
|---|---|---|---|
| 2004/0073854 | A1 | 4/2004 | Windl |
| 2004/0254762 | A1* | 12/2004 | Hopkins ........... H01L 21/67276 702/182 |
| 2005/0015217 | A1 | 1/2005 | Weidl et al. |
| 2005/0159835 | A1 | 7/2005 | Kamada |
| 2006/0259271 | A1 | 11/2006 | House |
| 2011/0238258 | A1 | 9/2011 | Singh et al. |
| 2012/0303662 | A1 | 11/2012 | Tewari et al. |
| 2013/0297548 | A1 | 11/2013 | Cescolini et al. |
| 2015/0279129 | A1 | 10/2015 | Ishikawa et al. |
| 2015/0309855 | A1* | 10/2015 | Agnihotram ........ G06F 11/0739 714/37 |
| 2015/0378805 | A1 | 12/2015 | Nakano |
| 2016/0054720 | A1* | 2/2016 | Lo ...................... G05B 19/054 700/87 |
| 2017/0262818 | A1* | 9/2017 | Horrell .............. G06Q 10/0635 |

FOREIGN PATENT DOCUMENTS

| | | | |
|---|---|---|---|
| CN | 1518698 A | 8/2004 | |
| CN | 1655325 A | 8/2005 | |
| CN | 1862278 A | 11/2006 | |
| CN | 101438249 A | 5/2009 | |
| CN | 101915234 A | 12/2010 | |
| CN | 101941623 A | 1/2011 | |
| CN | 101950327 A | 1/2011 | |
| CN | 102592172 A | 7/2012 | |
| CN | 102713777 A | 10/2012 | |
| CN | 102799606 A | 11/2012 | |
| CN | 102915028 A | 2/2013 | |
| CN | 103529825 A | 1/2014 | |
| CN | 103546338 A | 1/2014 | |
| CN | 103631788 A | 3/2014 | |
| CN | 103996077 A | 8/2014 | |
| CN | 104267346 A | 1/2015 | |
| CN | 104903866 A | 9/2015 | |
| CN | 104950866 A | 9/2015 | |
| CN | 105160483 A | 12/2015 | |
| EP | 1970786 A2 | 9/2008 | |
| EP | 1970786 A2 * | 9/2008 | ......... G05B 23/0254 |
| EP | 2128592 A1 | 12/2009 | |
| JP | 2012018623 A | 1/2012 | |
| WO | 0131411 A1 | 5/2001 | |
| WO | 03042769 A1 | 5/2003 | |
| WO | WO2007133543 A2 | 11/2007 | |
| WO | WO-2007133543 A2 * | 11/2007 | ......... G05B 23/0281 |
| WO | WO2008106071 A1 | 9/2008 | |

OTHER PUBLICATIONS

PCT International Search Report and Written Opinion of the International Searching Authority dated Nov. 7, 2016, for corresponding PCT/EP2016/057596.
Chinese Office Action for Chinese Application No. 201680083312.0 dated Apr. 20, 2021, with English translation.
Ximing, Dong: "Rail Transit Safety Risk Management"; China Railway Publishing House; 2014.
Chinese Decision to Grant for Chinese Application No. 201680083312.0 dated Nov. 9, 2021.

* cited by examiner

SMART EMBEDDED CONTROL SYSTEM FOR A FIELD DEVICE OF AN AUTOMATION SYSTEM

The present patent document is a § 371 nationalization of PCT Application Serial No. PCT/EP2016/057596, filed Apr. 7, 2016, designating the United States, which is hereby incorporated by reference, and this patent document also claims the benefit of U.S. Provisional Patent Application No. 62/305,621, filed Mar. 9, 2016, which is also hereby incorporated by reference.

TECHNICAL FIELD

The present disclosure relates to a smart embedded control system for a field device of an automation system. Further, the present disclosure relates to a method for diagnostic reasoning by a smart embedded control device and a corresponding computer program product directly loadable into the internal memory of a digital computer of a smart embedded control system.

BACKGROUND

Data that is provided by today's embedded automation equipment is mostly raw sensor data or raw measurements or unfiltered system log messages or unfiltered alarms. Due to complex structures in automation systems, there is a high number of different reasons for alarms and only some of them are severe ones or may cause severe problems, while others are minor problems or do not have an effect if they occur together with some other alarms or occur in a specific context. In today's automation systems, like in industry automation, the amount of different data sets generated, e.g., by sensors or external condition monitoring components is extremely high. At the same time, in many real-world scenarios the complete set of data generated by Programmable Logical Controllers cannot be sent to remote systems for analysis due to a limited communication bandwidth. This is particularly a problem for high resolution data such as a sensor with high sampling frequency and signals with extreme as well as fast changes in measurements such as current and voltage.

It is generally known that interpretation and utilization of the data tracked within an automation system is done on an enterprise level or Supervisory Control and Data Acquisition (SCADA) level or by additional, external conditional monitoring equipment. All of these different instances use separate engineering and installation processes. Monitoring or reporting functions are performed offline that means on data that is extracted from the automated control system and logged on an external storage.

Generally known solutions therefore cause a huge manual engineering effort to make raw data and events understandable and interpretable for the diagnostic systems external to the automation layer.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an object of this disclosure to provide a smart embedded control system for a field device of an automation system that allows an improved reasoning and diagnostic functionality on a controller of a field device of an automation system. It is furthermore an object of this disclosure to provide a method for diagnostic reasoning by a smart embedded control device and a corresponding computer program product directly loadable into the internal memory of a digital computer of a smart embedded control system that allow an improved reasoning and diagnostic functionality on a controller of a field device of an automation system.

According to a first aspect, a smart embedded control system for a field device of an automation system is provided. The smart embedded control system includes: a diagnostic application interface to a backend server for transferring data with signal analytics information, complex event pattern information and diagnostic information; a physical process interface to a signal data source for transferring signal data; a signal evaluation component for comparing received signal analytics information with received signal data in order to identify at least a first and a second event; a complex event processing component configured for applying received complex event pattern information at least to the first and second identified event in order to identify at least a first classified event; and a diagnostic reasoning component configured for deriving causal dependencies between at least the first classified event and at least a further classified event with regard to received diagnostic information in order to identify a root cause for at least the first classified event or predict an impact of at least the first classified event.

A diagnostic application interface connects the smart embedded control system, (e.g., an intelligent Programmable Logic Controller (PLC)), with a backend server. The diagnostic application interface may be a diagnostic application programming interface (API) visible outside of the PLC. Data transfer may be realized via input/output modules of the smart embedded control system. In particular, data with signal analytics, complex event pattern information and diagnostic information is transferred, wherein the diagnostic application interface may be used to upload or download the respective data sets.

The physical process interface is configured to build the connection to a signal data source and may be used for transferring signal data. Signal data is sampled, (e.g., at a sensor component), and then sent to the smart embedded control system via the physical process interface. Signal data may be any raw data measured, (e.g., within a manufacturing process), for example, measured as random sample at randomly chosen acts in the process or measured as a specific measurand on a regularly basis under the same circumstances.

The signal data together with the signal analytics information is analyzed by a signal evaluation component. Signal analytics information may be information about the expected received signal data, e.g., a threshold. The information is, in particular, based on historical signal data and its analysis. Received signal data, which is out-of-normal, may be easily automatically detected by comparison with the normal model. The result of the comparison by the signal evaluation component is at least a first and a second event in case of an anomaly detection. An event may be a data set that classifies a status of a process or classification of a data set. For example, a first event is an alarm message as result of the signal evaluation component that indicates, that received signal data is not within an expected range.

Signal analytics information may include error recognition algorithms or framework conditions that have to apply that signal data is classified as out-of-normal. For example, a vibration of a certain strength, which is recognized by an accelerometer sensor, is disregarded when a work piece is placed by a robot on a conveyer belt close to the sensor. Anomaly detection is, in particular, an analytic function that is implemented in the smart embedded control system based on statistical signal processing and statistical learning techniques.

The signal evaluation component connects raw data with relevant logical and semantic representation model components and makes it possible to put data into context, and therefore makes data meaningful and allows further prognostic reasoning about causes and trends at the PLC level.

In addition to the informed signal analytics information rooted in the statistics hidden in historical data, known domain-specific thresholds or control limits may be used to evaluate signal data and to recognize first and second events.

The complex event processing component analyzes the first and second event. The complex event processing component uses complex event pattern information to identify at least a first classified event. Based on the low-level first and second events raised on the anomaly detection layer, further processing on the symbolic level has to be applied to assess the meaning and importance of the generated first and second events. For example, an abnormal vibration event triggered by monitoring a spindle in a machine tool done by the signal evaluation component has to be treated differently if the machine is in the startup phase and not operated under full load. To distinguish different situations and contexts an additional interpretation layer that interprets the basic first and second events is required.

For example, raw signal data that indicates a short circuit is received. The first event indicating the short circuit was identified by the signal evaluation component. The signal analytics information, e.g., indicated that there was no maintenance work going on at the sealed security system and that therefore it may be assumed that the short circuit happened due to an unintended intrusion to the sealing of the security system. A second event was identified by the signal analytics component due to raw signal data indicating that a shock was measured by an accelerometer sensor. The signal analytics information includes the information that there is no act in the production process that may cause a shock such as a physical placement of a work piece or a processing act by a vibrating machine or similar. Therefore, there is a stream of events available for the complex event processing component. The received complex event pattern information may be searched for patterns including the two events short circuit and shock. For example, the historical data show that the combination of the two events short circuit and shock have been identified as originating from an external influence. The classified first event may include that there was an abnormal incident in die area close to the security sealing.

Due to the event-driven, streaming character of the incoming first and second events the usage of complex event processing technology is advantageously used to do this processing in the contextualization layer. In CEP, patterns over streams of events are matched against the sequence of actual events coming from anomaly detection and leading to the creation of new events once a pattern matches. The patterns are either manually defined by experts, derived from documentation, or they are learned from historic data. In this act, the optional numeric degree of abnormality may be interpreted as, for instance, a confidence value. This allows combining gradual information from different sources using methods such as fuzzy logics. For processing gradual information, the use of fuzzy semantics is especially advisable in the context of streaming processing as—in contrast to probabilistic semantics—inherent independence assumptions simplify the incremental processing of the events. In the contextualization layer, first and second events are also combined with events from other information sources such as the PLC self-management system like, e.g., log messages, or external systems interfacing to it.

There are many stream and complex event processing engines for different platforms available that may be used as basic engine for realizing this component, e.g., Drools Fusion, Esper, ETALIS. For use in embedded devices native C/C++ implementations of CEP algorithms are available or may be realized based on existing rule engines such as extension to CLIPS for stream processing.

The diagnostic reasoning component is configured to conduct a logic-based reasoning. The diagnostic reasoning component leverages available context knowledge to derive additional valuable information that enables the explanation of faults as well as predicting their impact. Diagnostic reasoning is not only about identifying basic alarms or other events based on sensor signal. It is about analyzing complex dependencies between classified events in order to identify and explain higher level systems faults. The diagnostic reasoning component conducts a deductive reasoning. Deductive reasoning derives new conclusions from a set of general rules and existing facts. It is a so called top down approach working from the more general to the more specific. The basic rule of interference follows the mathematical concept of "Modus Ponens", which means: if P implies Q, and P is known to be true, then Q must also be true. Because deductive reasoning naturally allows the application of general diagnostic rules to a concrete domain context the approach has proven to be very valuable in the area of diagnostics—especially in the fields of system safety and reliability engineering.

By applying standard deductive reasoning algorithms such as Tableau Algorithms implicit knowledge hidden in the data is deducible from explicitly stated knowledge.

Diagnostic information includes, in particular, asset and event context information and an underlying event model. An event model may be a hierarchy that models dependencies between classified events. The system may infer new information and add new information to known models from parts of the received diagnostic information. Even if there is no explicit relation modeled between two types of failures, the diagnostic reasoning component is configured to derive sub-class relations.

Additional diagnostic rules may be processed as diagnostic information to derive dependencies between a first classified event and a further classified event. The first classified event derived at the earlier stage of complex event processing is brought into relation with a further classified event. The further classified event may be another classified event generated by the complex event processing component, may be included in the diagnostic information, or may be stored at a database such as a historian on the smart embedded control system.

Diagnostic knowledge specifies and explains an unsatisfactory state of a system or a failure mode. One of the most interesting relations in the diagnostic setting is the causal relation between two events stating that one event is the reason for another event. Engineers' knowledge about events influencing or triggering other events is captured by a causes-relation and is included in the diagnostic information.

Classified events are automatically associated with the corresponding event class in a model fault tree which enables for example a root cause analysis. By traversing upstream in the fault tree, which means to the leaves, the smart embedded control system may perform the necessary tests to diagnose and isolate the root cause of a problem, ruling out other possible explanations that are not substantiated by event data.

Furthermore, an impact analysis may be conducted. By traversing downstream in a fault propagation tree, the diagnostic reasoning component may use the downstream effects to predict impacts and trigger appropriate actions such as maintenance or preventive measures, e.g., predictive maintenance activities.

The more information about classified events there are available for a deductive reasoning component, the more accurate a derived causal dependency may be. Information about further classified events or about identified first and second events or additional information such as environmental boundary conditions help to sharpen the deductive reasoning analysis.

The smart embedded control system provides not only basic events leaving their interpretation to higher levels in the automation system. Based on the combination of received signal analytics information, complex event pattern information, and diagnostic information, and the described three act analysis approach, the Smart Control will provide a higher-level view on events and alarms in the system, explaining faults and their reasons using dedicated fault tree analysis diagrams.

The proposed smart embedded control system allows computations about the status of the embedded control system on the same embedded hardware platform, including monitoring, diagnostic, prediction, or reporting functions. These computations are based on both embedded storage representing all the data manipulated in the process image of the embedded control system and a representation of the embedded control system functions, logic, variables, and parameters. The computations are performed real-time, in parallel to the control cycle. The results and reporting are immediate and grounded in the present state of the machine controlled and may be directly interpreted by external systems and operators. For example, instead of providing raw measurements and alarm messages, the smart embedded control system as proposed may provide already interpreted data indicating faults including information about their root causes as well as predictions about impacts of faults.

The described smart embedded control system runs on the same embedded hardware platform as the actual control system and performs computations about the status of the embedded control system representing monitoring, diagnostic, prediction, and reporting functions. The computations are performed in real-time, in parallel to a control cycle. The results and reporting are immediate and grounded in the present state of the machine or process controlled and may be directly interpreted, e.g., by external systems and operators. Instead of providing raw measurements and alarm messages the smart embedded control system provides already interpreted data indicating faults including information about their root causes or predictions about impacts of faults.

The diagnostic reasoning is pushed down to the field level with embedded data analytics functionality. There is no additional engineering effort necessary for state of the art off-line monitoring or diagnosing of data that is extracted from the control system and logged on external data storage. The engineering effort is reduced by sharing the same engineering environment and configuration as the control system as such. In an advantageous way, context information does not have to be transferred to an external analysis system. Therefore, a fast reaction to faults is possible, because the reasoning is done partially on the control device itself. An improved diagnostic functionality is provided due to availability of in-depth control knowledge within device, taking advantage of signals that cannot be reported to external diagnosis systems. The diagnostic information are accessible by operators in field without need to access a backend server, e.g., via WLAN.

It is an advantage of the described disclosure to provide a correct diagnostic behavior due to the manually defined expert knowledge that goes into the diagnostic information.

Connected devices such as Human Machine Interface-devices, SCADA, Manufacturing Execution Systems, etc., may receive the results from the diagnostic reasoning component or even further evaluated information like advised next acts in response to an identified root cause or a predicted impact, directly from the smart embedded control system.

In a possible embodiment, the smart embedded control system further includes an operation component configured to conduct next acts for maintenance or preventive measures based on the identified root cause or the predicted impact during runtime. Not only may the act of diagnostic reasoning be conducted directly on the smart embedded control system, but also the next acts of drawing conclusions from the derived data. That opens the promising way of evaluating and reacting on a control system, and both in real-time.

In a possible embodiment, the smart embedded control system connects the physical process interface with at least one sensor or at least one actuator. In a further possible embodiment, the smart embedded control system receives the signal data from the at least one sensor or the at least one actuator.

In another embodiment, the received signal analytics information includes logical or semantic models, wherein the models are derivable from historical signal data. To derive these models, for example sensor measurements have been analyzed, e.g., by an external component, to learn a univariate or multivariate normal distribution and to create a normal model of diagnostic features. More complex levels for analytic functions and corresponding more complex signal analytics information are possible, for example, fault classification. These may rely on statistical models created by training on both normal and faulty data, or more generally on labeled data. An abnormality detector, once automatically learned, may also automatically track one or more raw sensors or state variables in real-time. Therefore, out-of-normal conditions induce by default complex, relevant alert events.

While the event model employs pre-defined rules that capture event occurrences, abnormality events use dynamic, learned rules implicit in the models learned from historical data. Indeed, data representing a sensor or state variable may change or evolve, which means that its distribution shifts over time. This may happen, for instance, due to normal wear and tear in a mechanism or sensor over time. As a consequence, normality models may change, and the corresponding event generation rules change accordingly. The described learning-based abnormality detection methods may not only return a binary result like normal vs. abnormal, but a numerical degree of abnormality. As a result of the real-time low level analytics there are a bunch of necessary events, which are inferred by any analytics deployed directly on a PLC level as the smart embedded control system. Statistical algorithms for signal processing may be specified and calculated using tools like R, Matlab or are programmed, e.g., in C/C++/C#. For the latter, there are libraries available that provide implementations of standard algorithms, e.g., Aquila DSP.

According to a further embodiment, the first or second event is a detected anomaly. Anomaly detection is a real-time quantitative evaluation of the deviation of the present behavior from the learned normal behavior or baseline. Hereby, the degree of deviation between the current received signal data and the baseline may be used as a measure of the abnormality of the observed situation.

According to a further embodiment, the received complex event pattern information includes a plurality of patterns over streams of events, wherein the plurality of patterns distinguish between different situations or contexts, in which an event or stream of event occurs. That enables a granular association of the at least first event with context.

According to a further embodiment, the received diagnostic information includes definitions of events or of classified events, rules for dependencies between potential events or generic diagnostic or expert information. For example, an asset model defines an industrial system and the event types in the event context model explain transitions between states of the system. These event types include for example dedicated modes of operations like startup of a component as well as abnormalities such as faults and failures.

According to a further embodiment, the smart embedded control system further includes an inductive reasoning component for creating new knowledge data from historic streams of events as input data. In a statistical signal processing act, raw sensor inputs are firstly projected into a feature space, e.g., in time, frequency, time-frequency, or data-dependent domains, which is relevant to the respective sensor measurements. In the statistical learning act, machine learning techniques automatically create the baseline model from historical data. Advantageously, there is an automated improvement of diagnostic functionality during runtime of the system possible due to application of data-driven statistical learning. This means a reduced engineering effort due to automated learning of diagnostics knowledge and alarms.

The rules used on the contextualization layer may be defined by experts that have detailed knowledge about the specifics of the system. However, such information may not be readily available, e.g., for new systems or new evaluation patterns. This problem of creating appropriate knowledge as new knowledge data may be solved by pattern learning or inductive reasoning. Similar to learning normality models on the anomaly detection layer, the idea is to utilize the available historic data to automatically create knowledge from data. The input data is streams of events, and the output are complex rules as well as inferred events from the Smart Controls directly rather than statistical models. This localized approach derives rules that are specific for a given device at the origin of data creation, without the need to transfer large amounts of data to a central instance.

An inductive reasoning process, where possible complex event processing rules are automatically generated may be described as a mathematical problem of information correlation. An information correlation of event sequences allows automated analysis of a single problem, indicated as a goal event in the whole depth, combining an appropriate reduction of a huge number of events, repeatable statistical correlations of a number of events, explaining a particular indication, not only a set of relevant events, but also logical dependencies among them, root-cause analysis of the related problem or deployment of expertise in automated way for further analysis of new upcoming events. The following event pattern mining algorithm may be applied: temporal pattern mining based on PrefixSpan. This algorithm finds most probable sequences of events, which lead to the goal event (e.g., event of interest). It includes the following acts for the algorithm programming:

In act 1, all relevant for the analysis events is merged together, due to the provided timestamp of each event from all available sources (e.g., inferred and complex events).

In act 2, a goal event (e.g., an event of interest) is specified for the analysis.

In act 3, all events are encoded for further processing (e.g., "ALARM 123"→A).

In act 4, a specific time window is filtered for duplicates (e.g., A,B,A,C→A,B,C/if it is less than 1 minute between both A's).

In act 5, log records are split into chunks (e.g., sequences) due to the number of repetitions of goal events: specified time before and after key event is taken for correct splitting (e.g., A,C,D,B,C,A,E,K,B,C,D,A,K,E→[B,C,A,E,K,B,C], [C,D,A,K,E], where K is a key event, and [ . . . ] are chunks).

In act 6, the algorithm is set up, wherein: (a.) Specify Goal Event as key event; (b.) Specify Start Event as starting event for a further sequence (optional); (c.) Specify minimal support %–expected minimal confidence of found patterns (e.g., 100%×number of pattern occurrences/number of key events); (d.) Specify minimal sequence length (e.g., minimal number of events to be expected in patterns); (e.) Specify whether to Aggregate events into simultaneous groups (e.g., if two or more events happened during one time stamp, then they will be grouped together)—it allows to avoid further additional computational time for extracting temporal dependencies among this events; and (f.) Specify whether to Extract temporal dependencies.

In act 7, the following acts may be performed using a PrefixSpan algorithm, which is a depth-first algorithm: (a.) All events from chunks are stored in the library; (b.) Calculate their probability to appear in every chunk and store it also in the library (e.g., number of appearances/number of chunks); (c.) Filter all events from the library, which probability is less than specified minimal support; (d.) Take an event from the library as a root (e.g. A); and (e.) Take a next event into sequence together with previous (e.g., AB, ABC): i. Check whether this sequence is not yet partially in one of the patterns in results, If yes, goto "e"; ii. Check whether a probability of this sequence more than specified minimal support, If not, then filter this root event from the library and go to "d"; iii. Check whether a sequence length is less than minimal sequence length; If not, then include this sequence as possible pattern and goto "d"; iv. Goto "e".

In act 8, each pattern is taken from the results and temporal dependencies are extracted, wherein: (a.) Get max time between neighbors of each event in the pattern in all chunks, where pattern may be applied; and (b.) Get min time between neighbors of each event in the pattern in all chunks, where pattern may be applied.

In act 9, rules based on this pattern are built in some appropriate format (e.g., CEP format dependent on the chosen CEP tool).

Applying an automated root-cause analysis based on the temporal pattern mining algorithm enables automatically correlate information relevant for a single problem indications and alarms in the whole depth, combining: (1) an appropriate reduction of a huge number of events, (2) repeatable statistical correlations of a number of events, explaining a particular indication, (3) not only a set of relevant events, but also logical dependencies among them, (4) root-cause analysis, (5) further deployment of expertise in automated way for analysis of new upcoming events, applying found patterns as CEP rules.

According to another aspect, a method for diagnostic reasoning by a smart embedded control device is suggested, including the following acts: transferring data with signal analytics information, complex event pattern information and diagnostic information from a backend server to the smart embedded controller; transferring signal data from a signal data source to the smart embedded controller; comparing received signal analytics information with received signal data and identifying at least a first and a second event by an evaluation component of the smart embedded controller; applying received complex event pattern information at least to the first and second identified event and identifying a first and second classified event by a complex event processing component of the smart embedded controller; and deriving causal dependencies between at least the first and the second classified event with regard to received diagnostic information and identifying a root cause for at least the first and second classified event or predicting an impact of at least the first and second classified event by a diagnostic reasoning component of the smart embedded controller, wherein the identified root cause or the predicted impact may be used by the smart embedded control system to conduct next acts for maintenance or preventive measures during runtime.

According to an embodiment, comparing received signal analytics information with received signal data and identifying at least a first and a second event is executed data-driven.

According to a further embodiment, applying received complex event pattern information at least to the first and second identified event and identifying a first and second classified event is executed data-driven.

According to a further embodiment, deriving causal dependencies between at least the first and the second classified event with regard to received diagnostic information and identifying a root cause for at least the first and second classified event or predicting an impact of at least the first and second classified event is executed query-driven.

According to a further embodiment, new knowledge data is created from historic streams of events as input data.

According to a further embodiment, an automated analysis of a goal event is performed by an information correlation of event sequences as historic streams of events.

According to another aspect, a computer program product directly loadable into the internal memory of a digital computer of a smart embedded control system is suggested, including software code portions for performing the acts of: providing signal analytics information, complex event pattern information and diagnostic information from a backend server; providing signal data from a signal data source; comparing received signal analytics information with received signal data and identifying at least a first and a second event; applying received complex event pattern information at least to the first and second identified event and identifying a first and second classified event; deriving causal dependencies between at least the first and the second classified event with regard to received diagnostic information and identifying a root cause for at least the first and second classified event or predicting an impact of at least the first and second classified event, wherein the identified root cause or the predicted impact may be used by the smart embedded control system to conduct next acts for maintenance or preventive measures during runtime.

BRIEF DESCRIPTION OF THE DRAWINGS

The following different aspects of the present disclosure are described in more detail with reference to the enclosed figures.

DETAILED DESCRIPTION

Figure 1:
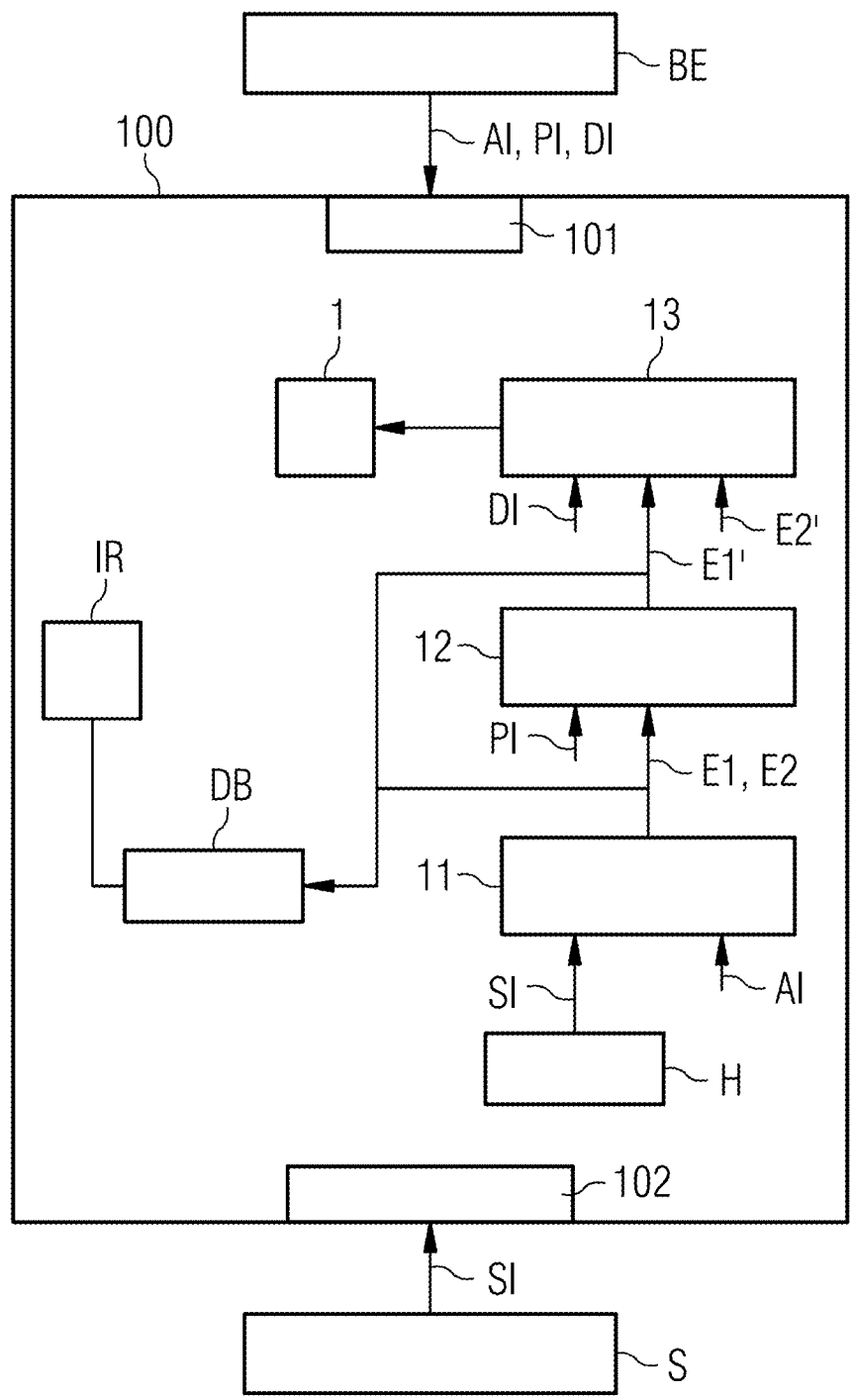
FIG. 1 depicts a diagram of an exemplary embodiment of a smart embedded control system for a field device of an automation system.

FIG. 1 depicts a diagram of a smart embedded control system 100 with a diagnostic application interface 101 to a backend server (BE), a physical process interface 102 to a signal data source, (e.g., a sensor S). The sensor S delivers signal data SI. An embedded historian H or Process Image or Real-time database is provided on the smart embedded control system 100 to store signal data SI over multiple control cycles. Signal analytics information AI is downloaded via the diagnostic application interface 101. Moreover, the diagnostic application interface AI may be used to set application parameters such as, e.g., alarm subscription parameters or alarm threshold values.

An Input/Output module may be provided that combines the diagnostic information interface with a query interface. The query interface is useful to allow a query-driven mode of, e.g., the diagnostic reasoning component. While low level analysis by the signal evaluation component may be data-driven, being active as soon as signal data is received, and the complex event processing may be data-driven, evaluating the first and second events, when they are received, the diagnostic reasoning component in particular only starts the evaluation process if a request about, for example, root causes or preventive measures is received.

A signal evaluation component 11 is configured to compare the received signal data SI with the received signal analytics information AI. The result from this comparison is a first event E1 and a second event E2. This may be seen as a low level analysis of the raw signal data. The goal is mainly to avoid false alarms by putting the raw data into context or to correct signal data so that irrelevant data may be disregarded.

The next evaluation level in the smart embedded control system 100 is handled by the complex event processing component 12. The complex event processing component 12 puts the first and second identified events E1, E2 into context. At the same time, the complex event processing component 12 allows an evaluation of the relevance or the priority or the urgency or meaning or importance of the first and second event E1, E2. The complex event processing component 12 uses complex event pattern information PI, which is downloaded via the diagnostic application interface AI, too. The main goal here is to search for patterns in the received event data. The potential patterns are included in the complex event pattern information PI. As a result, a classified first event E1' is created. That helps distinguishing between different situations and contexts. Any numeric degrees of abnormality may be interpreted as confidence value. The patterns are either manually defined by experts, derived from documentation, or they are learned from historic data, which was created on the smart embedded control system 100 itself.

The core diagnostic feature is performed by the diagnostic reasoning component 13. The diagnostic reasoning component 13 receives the classified first event E1' and a further classified event E2' as input as well as diagnostic information DI. The ultimate goal is to identify system faults 1. This is done by combining at least the first classified event E1' and the further classified event E2', putting them into context by using the diagnostic information DI and deriving new causal dependencies. The further classified event E2' may be extracted from a previous or subsequent complex event processing act or received as part of the diagnostic information or provided by the embedded historian H.

The information about the identified events E1, E2 and the classified event E1' may be stored in an event database DB, which is used to support, e.g., an inductive reasoning component IR with the historic data from previous control cycles. Furthermore, the event database is used to provide the event information to the diagnostic reasoning component.

Figure 2:
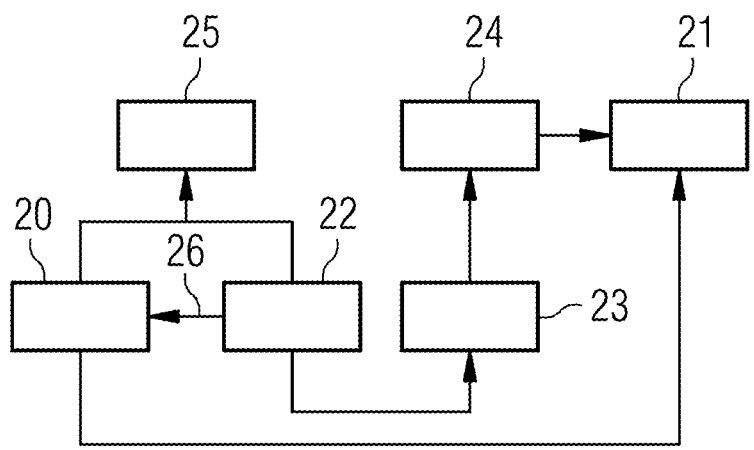
FIG. 2 depicts a block diagram of an extended event model created by the diagnostic reasoning component according to another embodiment.

The method of diagnostic reasoning is illustrated in FIG. 2. An asset and event context information is the basis of the diagnostic information. In the event model, two types of failures are represented: conveyer failures 20 affecting the conveyer hardware 21 and power failures 22 affecting an electric engine 23 that serves as a drive 24 for the conveyer 21. No explicit relation between the two types of failures 20 and 22 is modeled. However, by applying deductive reasoning, the diagnostic reasoning component is able to infer that in this specific case a power failure 22 is a certain type of conveyer failure 20 because the former affects part of the conveyer 21. These kinds of subclass-relations 26 are used for subsequent diagnostic processing. They enable the application of diagnostic rules or procedures, (e.g., defined for conveyer failures or for more specific failures such as power failures). For example, with this additional knowledge faults 25 that may be explained by conveyer failures 20 now may also be explained by power failures 22.

In an additional act, additional diagnostic rules are processed to derive dependencies between classified events. These dependencies are the basis for explaining the root cause of a fault or for assessing the impact of an observed failure.

One of the most interesting relations in the diagnostic setting is the causal relation between two events stating that one event is the reason for another event. The knowledge by engineers, which events might influence or trigger other events, is integrated into the diagnostic process. This knowledge may be captured by a causes-relation. For example, it is assumed that a causes-relation between two failures x and y exists if y follows x and both have been generated when processing the material with the same ID. Based on the causes-relations, the diagnostic reasoning component is able to derive a fault tree analysis (FTA) diagram. FTA diagrams are commonly used to illustrate events that led or might lead to a fault.

FTA diagrams may be constructed manually by engineers, which is cumbersome and time-consuming. Based on the semantic context and diagnostic models, the diagnostic reasoning component on the smart embedded control system is able to automatically construct and provide FTA diagrams. Based on the FTA diagram, decision making may be guided.

The first and second classified events may be automatically associated to the corresponding event class in the fault tree which enables, in particular, the following interpretations: an impact analysis may be conducted or a root cause analysis.

Figure 3:
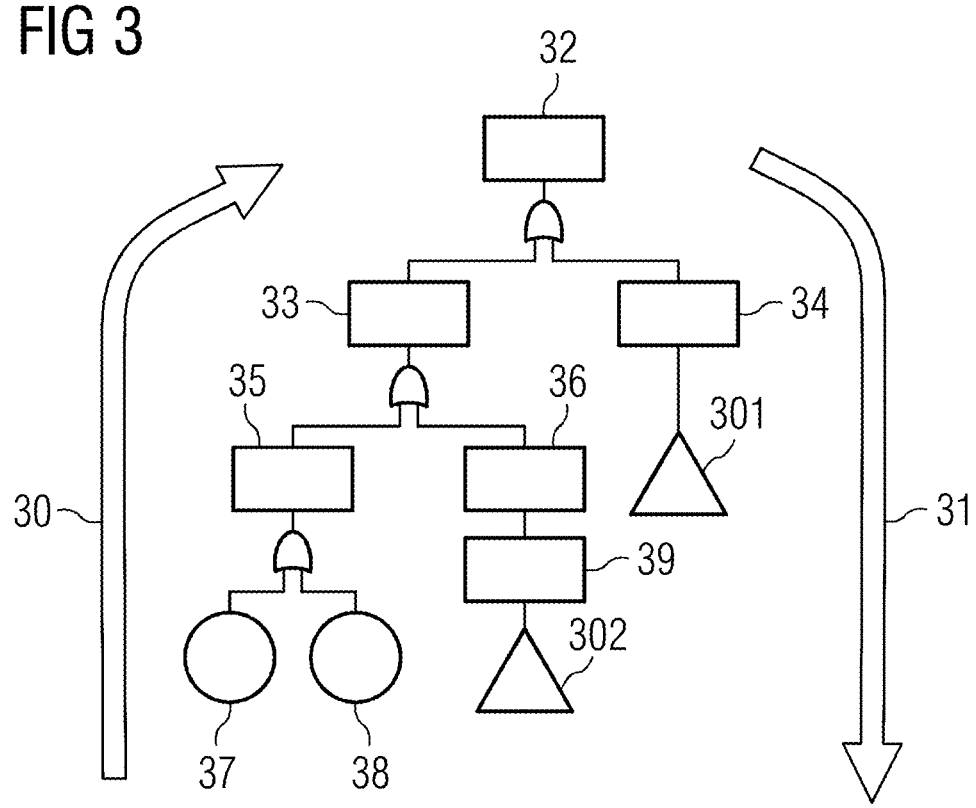
FIG. 3 depicts a block diagram of an automatically generated fault tree generated from context and diagnostic models within a smart embedded control system according to another embodiment.

The method of deductive reasoning via a fault tree analysis is illustrated in FIG. 3. By traversing upstream in the fault tree, (e.g., to the leaves), in the direction of the root cause analysis arrow 31, the diagnostic reasoning component may perform the necessary tests to diagnose and isolate the root cause of a problem, ruling out other possible explanations that are not substantiated by event data. For example, the reason for a door quality problem 32 may be determined by looking for other observed events in the upstream tree. In case that an hardware failure 33 is observed and no hint of an input material problem 34 may be found, two possible paths in the fault tree may be considered: a body positioning error 35 or a door grabbing error 36 potentially cause the door quality problem according to the used context model. Again, different paths with different structures or dependencies potentially lead to the initial fault, e.g., the leave causing the root fault. For example, the body position error 35 may be the result of a missing bar code reader signal 37 or an abnormal positioning loop count 38. The door grabbing error 36 on the other hand may be caused by a robot calibration error 39. This branch of the fault tree references to a sub tree covering robot faults 302.

Another helpful method based on fault trees is the so called impact analysis: By traversing downstream in a fault propagation tree along the impact analysis arrow 30, the reasoning engine may use the downstream effects to predict impacts and trigger appropriate actions such as predictive maintenance activities. The observation of an Abnormal Positioning Loop Count event 38 may indicate a subsequent Door Quality Problem 32.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A smart embedded control system for a field device of an automation system, the smart embedded control system comprising:
   a diagnostic application interface to a backend server configured to transfer data with signal analytics information, complex event pattern information, and diagnostic information;
   a physical process interface to a signal data source configured to transfer signal data;

a signal evaluation component configured to compare received signal analytics information with the signal data in order to identify at least a first event and a second event such that the signal data is placed into context or corrected and irrelevant signal data is disregarded;

a complex event processing component configured to apply received complex event pattern information at least to the first identified event and the second identified event in order to search for patterns in the first identified event and the second identified event and identify at least a first classified event, wherein the received complex event pattern information comprises a plurality of patterns over streams of events, and wherein the plurality of patterns is arranged to distinguish between different situations or contexts in which an event or stream of event occurs; and a diagnostic reasoning component configured to derive causal dependencies between at least the first classified event and at least a further classified event based on the received diagnostic information in order to identify a root cause for at least the first classified event, predict an impact of at least the first classified event, or both identify the root cause and predict the impact.

2. The smart embedded control system of claim 1, further comprising:
an operation component configured to conduct next steps for maintenance or preventive measures based on the identified root cause or the predicted impact during runtime.

3. The smart embedded control system of claim 1, wherein the physical process interface connects with at least one sensor or at least one actuator.

4. The smart embedded control system of claim 3, wherein the signal data is configured to be received from the at least one sensor or the at least one actuator.

5. The smart embedded control system of claim 1, wherein the received signal analytics information comprises logical or semantic models, wherein the logical or semantic models are derivable from historical signal data.

6. The smart embedded control system of claim 1, wherein the first event and the second event are detected anomalies.

7. The smart embedded control system of claim 1, wherein the received diagnostic information comprises definitions of events or of classified events, rules for dependencies between potential events, or generic diagnostic or expert information.

8. The smart embedded control system of claim 1, further comprising:
an inductive reasoning component for creating new knowledge data from historic streams of events as input data.

9. The smart embedded control system of claim 1, wherein the first event or the second event is an alarm message indicating that the signal data is not within an expected range.

10. The smart embedded control system of claim 1, wherein the received diagnostic information includes asset and event context information and an underlying event model, and
wherein the underlying event model is a hierachy that models dependencies between classified events.

11. A method for diagnostic reasoning by a smart embedded control device, the method comprising:
transferring data with signal analytics information, complex event pattern information, and diagnostic information from a backend server to the smart embedded controller;
transferring signal data from a signal data source to the smart embedded controller;
comparing received signal analytics information with the signal data and identifying at least a first event and a second event by an evaluation component of the smart embedded controller;
applying received complex event pattern information at least to the first identified event and the second identified event and identifying at least a first classified event by a complex event processing component of the smart embedded controller; and
deriving causal dependencies between at least the first classified event and at least a further classified event with regard to received diagnostic information and identifying a root cause for at least the first classified event or predicting an impact of at least the first classified event by a diagnostic reasoning component of the smart embedded controller,
wherein at least one of the following occurs:
the comparing of the received signal analytics information with the signal data and the identifying of the first event and the second event is executed data-driven,
the applying of the received complex event pattern information at least to the first identified event and the second identified event and the identifying of the first classified event is executed data-driven, or
the deriving of the causal dependencies between the first classified event and the further classified event with regard to received diagnostic information and the identifying of the root cause for the first classified event or the predicting of the impact of the first classified event is executed query-driven.

12. The method of claim 11, wherein the identified root cause or the predicted impact are used by the smart embedded control device to conduct next steps for maintenance or preventive measures during runtime.

13. The method of claim 12, wherein the identified root cause or the predicted impact are used by an operation component of the smart embedded control device.

14. The method of claim 11, wherein the comparing of the received signal analytics information with the signal data and the identifying of the first event and the second event is executed data-driven.

15. The method of claim 11, wherein the applying of the received complex event pattern information at least to the first identified event and the second identified event and the identifying of the first classified event is executed data-driven.

16. The method of claim 11, wherein the deriving of the causal dependencies between the first classified event and the further classified event with regard to received diagnostic information and the identifying of the root cause for the first classified event or the predicting of the impact of the first classified event is executed query-driven.

17. The method of claim 11, further comprising:
creating new knowledge data from historic streams of events as input data.

18. A method for diagnostic reasoning by a smart embedded control device, the method comprising:

transferring data with signal analytics information, complex event pattern information, and diagnostic information from a backend server to the smart embedded controller;

transferring signal data from a signal data source to the smart embedded controller;

comparing received signal analytics information with received signal data and identifying at least a first event and a second event by an evaluation component of the smart embedded controller;

applying received complex event pattern information at least to the first identified event and the second identified event and identifying at least a first classified event by a complex event processing component of the smart embedded controller;

deriving causal dependencies between at least the first classified event and at least a further classified event with regard to received diagnostic information and identifying a root cause for at least the first classified event or predicting an impact of at least the first classified event by a diagnostic reasoning component of the smart embedded controller; and creating new knowledge data from historic streams of events as input data, wherein an automated analysis of a goal event is performed by an information correlation of event sequences as the historic streams of events.

19. A non-transitory computer readable medium storing thereon a computer program product, which, when executed by a computer of a smart embedded control system, causes the smart embedded control system to:

provide signal analytics information, complex event pattern information, and diagnostic information from a backend server;

provide signal data from a signal data source;

compare received signal analytics information with the signal data and identify at least a first event and a second event such that the signal data is placed into context or corrected and irrelevant signal data is disregarded;

apply received complex event pattern information at least to the first identified event and the second identified event in order to search for patterns in the first identified event and the second identified event and identify a first classified event, wherein the received complex event pattern information comprises a plurality of patterns over streams of events, and wherein the plurality of patterns is arranged to distinguish between different situations or contexts in which an event or stream of event occurs; and derive causal dependencies between at least the first classified event and at least a further classified event with regard to received diagnostic information and identify a root cause for at least the first classified event or predict an impact of at least the first classified event.

* * * * *